United States Patent [19]

Himmelstein

[11] 4,142,591

[45] Mar. 6, 1979

[54] TORQUE-YIELD CONTROL SYSTEM

[75] Inventor: Sydney Himmelstein, Lake Bluff, Ill.

[73] Assignee: S. Himmelstein and Company, Elk Grove Village, Ill.

[21] Appl. No.: 811,988

[22] Filed: Jun. 29, 1977

[51] Int. Cl.[2] .......................... G01N 3/22; B25B 23/14

[52] U.S. Cl. .......................................... 173/12; 73/139

[58] Field of Search ..................... 173/12; 73/139, 88 F

[56] References Cited

U.S. PATENT DOCUMENTS

| | | | |
|---|---|---|---|
| 3,827,506 | 8/1974 | Himmelstein et al. | 173/12 |
| 3,965,778 | 6/1976 | Aspers et al. | 173/12 |
| 4,008,772 | 2/1977 | Boys | 73/139 |
| 4,023,406 | 5/1977 | Benz | 73/88 F |
| 4,027,530 | 6/1977 | Tambini et al. | 73/88 F |

*Primary Examiner*—Robert A. Hafer

*Attorney, Agent, or Firm*—Wegner, Stellman, McCord, Wiles & Wood

[57] ABSTRACT

An apparatus for applying torque between one or more pairs of threaded members to effect a desired set condition. The set condition is determined by a control which terminates the application of torque when a preselected yielded tensioning of the threaded members is determined. The control is responsive to signals received from a torquemeter and an angle sensing device for determining seriatim the incremental increase in torque provided by the torque apparatus corresponding to a preselected incremental angle of rotational change. The control discontinues application of torque between the threaded members as an incident of a preselected decrease in the determined incremental torque increase. The threaded members may be first seated as by use of a low torque, high speed threading operation. The setting of the seated members may then be effected by a high torque, low speed threading operation. A plurality of pairs of threaded members may be concurrently set by the apparatus. The high torque, low speed threading operation may be controlled so as to permit application thereof only after all of the plurality of pairs of threaded members are seated by the low torque, high speed threading apparatus. The control utilizes a peak memory for retaining the highest value of torque applied between the threaded members and compares the sensed torque seriatim with the peak torque value of the peak memory in effecting the desired control of the threading operation.

23 Claims, 7 Drawing Figures

TORQUE-YIELD CONTROL SYSTEM

BACKGROUND OF THE INVENTION

1. Field of the Invention

This invention relates to torque-applying apparatus and in particular to such apparatus responding to a yielded condition of the threaded members to effect a discontinuation of the threading operation.

2. Description of the Prior Art

In U.S. Pat. No. 3,827,506 of Sydney Himmelstein et al, which patent is owned by the assignee hereof, an improved torque-applying apparatus is disclosed having one or more torque motors arranged for forcibly threading one or more pairs of first threaded members into tightened association with corresponding second threaded members. The control of the apparatus causes firstly a seating of the first threaded members relative to the second threaded members by a low torque, high speed threading operation. When the seated condition of all of the threaded members is sensed, the control effects a low speed, high torque further threading of the seated threaded members until a preselected maximum torque condition is achieved corresponding to the desired tightened set condition of the threaded members.

In U.S. Pat. No. 3,643,501, of Reginald W. Pauley, a wrenching system and method is disclosed wherein the torque on the fastener applied by the wrench is measured concurrently with the measurement of the angle through which the fastener is rotated. The torque and rotation angle are simultaneously compared and when the rotation angle begins increasing at a nonlinear rate relative to the increase of torque, a signal is created indicating that the strain on the fastener exceeds the elastic limit thereof. The signal may be utilized to actuate a shutoff means to stop the wrench.

In U.S. Pat. No. 3,368,396 of Glenn G. Van Burkleo et al, an apparatus is disclosed for controlling the tightness of couplings of well pipe strings. A series of determinations of torque is made for controlling the tightening of the pipe string.

A number of patents have been obtained by Standard Pressed Steel Company, of Jenkintown, Pa., relating to tightening methods and systems utilizing the yield point control concept of the Pauley patent discussed above. These patents include U.S. Pat. No. 3,939,920 of Russell J. Hardiman et al, U.S. Pat. No. 3,974,685 of Richard A. Walker, U.S. Pat. No. 3,974,883 of Jerry A. Sigmund, U.S. Pat. No. 3,982,419 of John T. Boys, and U.S. Pat. No. 4,000,782 of Robert J. Finkelston. U.S. Pat. No. 3,939,920 discloses a system wherein the fastener is brought to its yield point to determine its torque-angular displacement curve, and then after being loosened, is brought back to a preselected portion of the calculated curve.

U.S. Pat. No. 3,974,685 uses a means for determining a false yield, or similar condition of the fastener, so as to determine the specific torque-angular displacement curve for a given fastener and provides control means for then tightening the fastener to a desired load based on that determined curve.

U.S. Pat. No. 3,974,883 discloses a tightening system wherein a theoretical curve is calculated after making a number of gradient determinations with a control means developing a control signal when the theoretical curve and one of the measured signals has a predetermined relation representative of the yield point.

U.S. Pat. No. 4,000,782 discloses means for providing a signal indicating when the wrench and control means are functioning properly and quality control means for continuously checking the different signals.

SUMMARY OF THE INVENTION

The present invention comprehends an improved torque-applying apparatus having an improved means for determining the yielded condition of the threaded members to provide a signal for causing discontinuation of further tightening of the threaded members.

The control may include means for firstly effecting a seated condition of the threaded members by a high speed, low torque threading operation. Where a number of threaded members are being concurrently tightened, the control may cause further setting of the respective pairs of threaded members until all of the pairs have been so seated.

The control includes means responsive to the torque sensing means and angle sensing means for determining the incremental increase in torque provided by the torque means corresponding to a preselected incremental angle of rotational change during the threading operation.

The control includes means for discontinuing application of the torque between the threaded members by the torque means as an incident of the preselected decrease in the determined incremental torque increase sensed by the torque sensor.

The control may include a peak memory device for storing the highest previously sensed torque value for comparison with the next sensed torque value to determine the incremantal torque increase.

The peak memory device may comprise a resettable analog peak memory device.

The torque means may include a rotor and the means for sensing the angle of rotation between the threaded members may comprise means for sensing the amount of rotation of the torque means rotor. In the illustrated embodiment, the torque means comprises a fluid-operated motor having rotatable vanes, the means for sensing the angle of rotation between the threaded members comprising means for sensing the amount of rotation of the torque motor vanes.

Where a plurality of pairs of first and second threaded members are being concurrently set by the apparatus, the control of the threading operation to effect the seating of the pairs of threaded members may be by determination of a preselected torque condition between the respective threaded members. The subsequent setting operation may be effected by the tension-yield control discussed above.

The operation of the tension-yield control means may be deferred until the setting operation has been initiated so as to cause the torque-angle of rotation curve for the given pair of threaded members to be at least a preselected minimum value whereat the increase in applied torque for a given angular rotation is effectively constant.

The termination of the threading operation may be effected when the increase in the torque for the given incremental rotation decreases indicating that the yield point of the threaded members has been reached.

The invention comprehends preselecting a value of the decreased incremental torque which is beyond the initial yield portion of the curve so as to effectively positively assure that the threaded members have achieved a yielded condition.

The control may include indicating means such as for indicating instantaneous torque, average torque, peak torque, and the yield status of the threaded members.

The control may include means for selectively causing termination of the high torque, low speed setting operation as a function of torque rather than yield condition of the threaded members, when desired.

In the illustrated embodiment, the torque sensor comprises a strain gauge torquemeter.

The torque-applying apparatus of the present invention is extremely simple and economical of construction while yet providing a highly improved controlled tightening of one or more sets of threaded members.

BRIEF DESCRIPTION OF THE DRAWING

Other features and advantages of the invention will be apparent from the following description taken in connection with the accompanying drawing wherein.

DESCRIPTION OF THE PREFERRED EMBODIMENT

Figure 1:
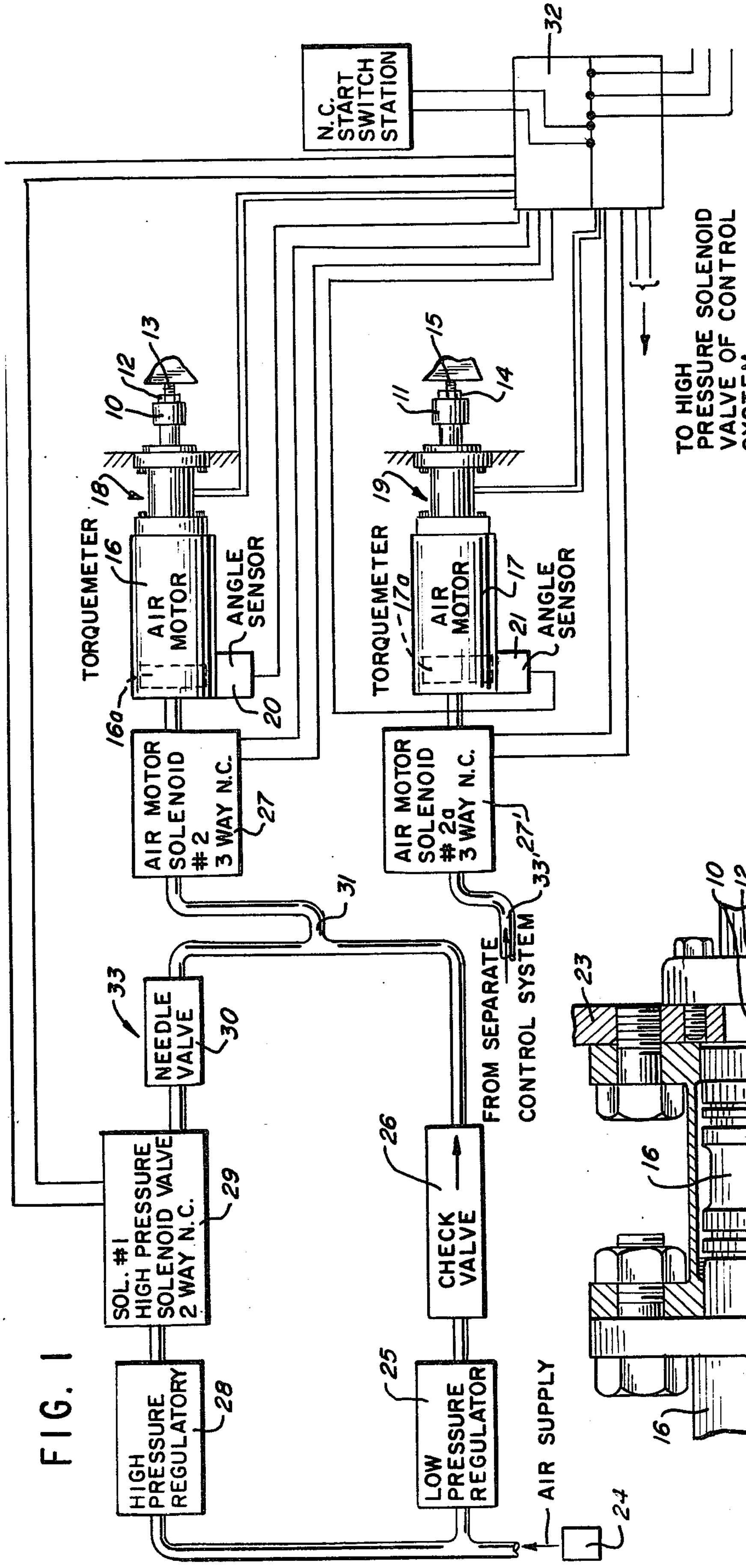
FIG. 1 is a schematic block diagram of a torque-applying apparatus having a control embodying the invention.

In the exemplary embodiment of the invention as disclosed in the drawing, a plurality of spindles, illustratively spindles 10 and 11, are provided for effecting concurrent threaded tightening of a pair of threaded members which illustratively may comprise a first pair of threaded members 12 and 13 and a second pair of threaded members 14 and 15. First threaded members 12 and 14 may illustratively comprise nuts to be threaded on the second threaded members 13 and 15 which illustratively may comprise bolts.

Figure 2:
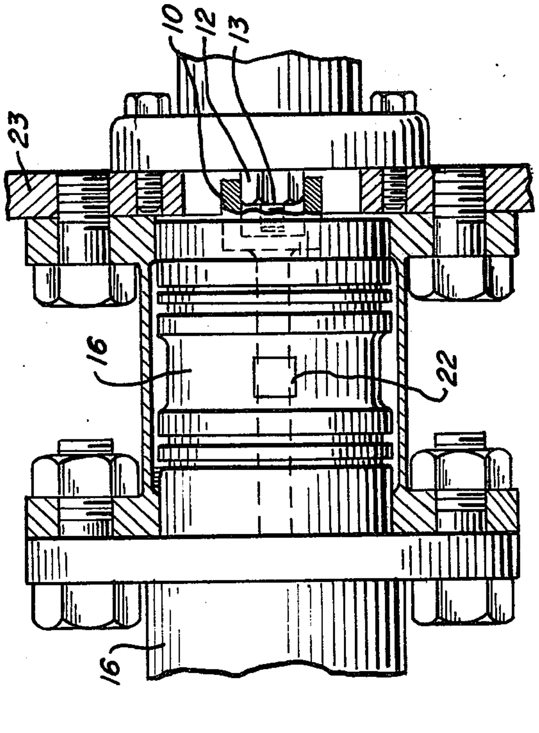
FIG. 2 is a side elevation, partially in diametric section illustrating the torque-applying apparatus.

In the illustrated embodiment, as shown in FIGS. 1 and 2, spindle 10 is driven by a first air motor 16 and spindle 11 is driven by a second air motor 17. A first torque sensor 18 may be associated with air motor 16 and spindle 10 and a second torque sensor 19 may be associated with the second air motor 17 and spindle 11, as illustrated in FIG. 1. In the illustrated embodiment, the torque sensors comprise torquemeters utilizing strain gauges, and more specifically, as shown in FIG. 1, the torquemeters 18 and 19 may comprise reaction-type torquemeters, it being understood that any suitable torque sensor may be utilized for providing suitable signals to the control corresponding to the torque developed by the air motors in effecting the threaded setting of the first and second threaded members.

As indicated briefly above, the invention further comprehends the use of angle sensors for determining the amount of rotation of the first threaded members relative to the second threaded members during the threading operation. Thus, illustratively, as shown in FIG. 1, an angle sensor 20 may be associated with air motor 16 and an angle sensor 21 may be associated with air motor 17. In the illustrated embodiment, the torque motors comprise air motors having vanes **16*a* and 17*a*, respectively, the angle sensors 20 and 21 sensing the angle of rotation of the vanes to provide a corresponding indication of the angular rotation of the threaded members 12 and 14 relative to the threaded members 13 and 15**.

As shown in FIG. 2, the torquemeter 16 illustratively may include a strain gauge 22 for indicating the reaction torque between the spindle 10 and the support 23 carrying the threaded member 13.

As indicated above, the torque means may comprise air motors. Pressurized air for operation thereof may be obtained from a conventional high pressure air supply 24. Air may be delivered to the respective air motors through a parallel circuit including in one branch a low pressure regulator 25 and a check valve 26. The check valve is connected through an air motor solenoid 27 to the air motor 16.

The other branch of the air supply includes a high pressure regulator 28, a high pressure solenoid valve 29, and a needle valve 30. Illustratively, air from supply 24 may be delivered at a pressure of approximately 100 p.s.i. through the high pressure branch to the air motor 16 and at a reduced pressure of approximately 50 p.s.i. through the low pressure branch thereof.

As shown in FIG. 1, the two branches may be joined by a common conduit 31 connected to the solenoid 27 for delivering air selectively at high or low pressure to the air motor. Control of the solenoid is effected by a control generally designated 32 through suitable interconnecting conductors in response to the signals delivered to the control 32 from the torquemeters 18, 19 etc., and angle sensors 20, 21, etc.

As shown in FIG. 1, each of the air motors may be controlled by a corresponding motor solenoid 27, 27', etc. Pressurized air may be delivered to the respective solenoids by separate branched air supplies 33, 33', etc. Control 32 is associated with each of the solenoids of each of the different branched air supplies and motor solenoids to effect the desired control of setting of the plurality of pairs of threaded members intended to be concurrently set by the apparatus.

Figure 3:
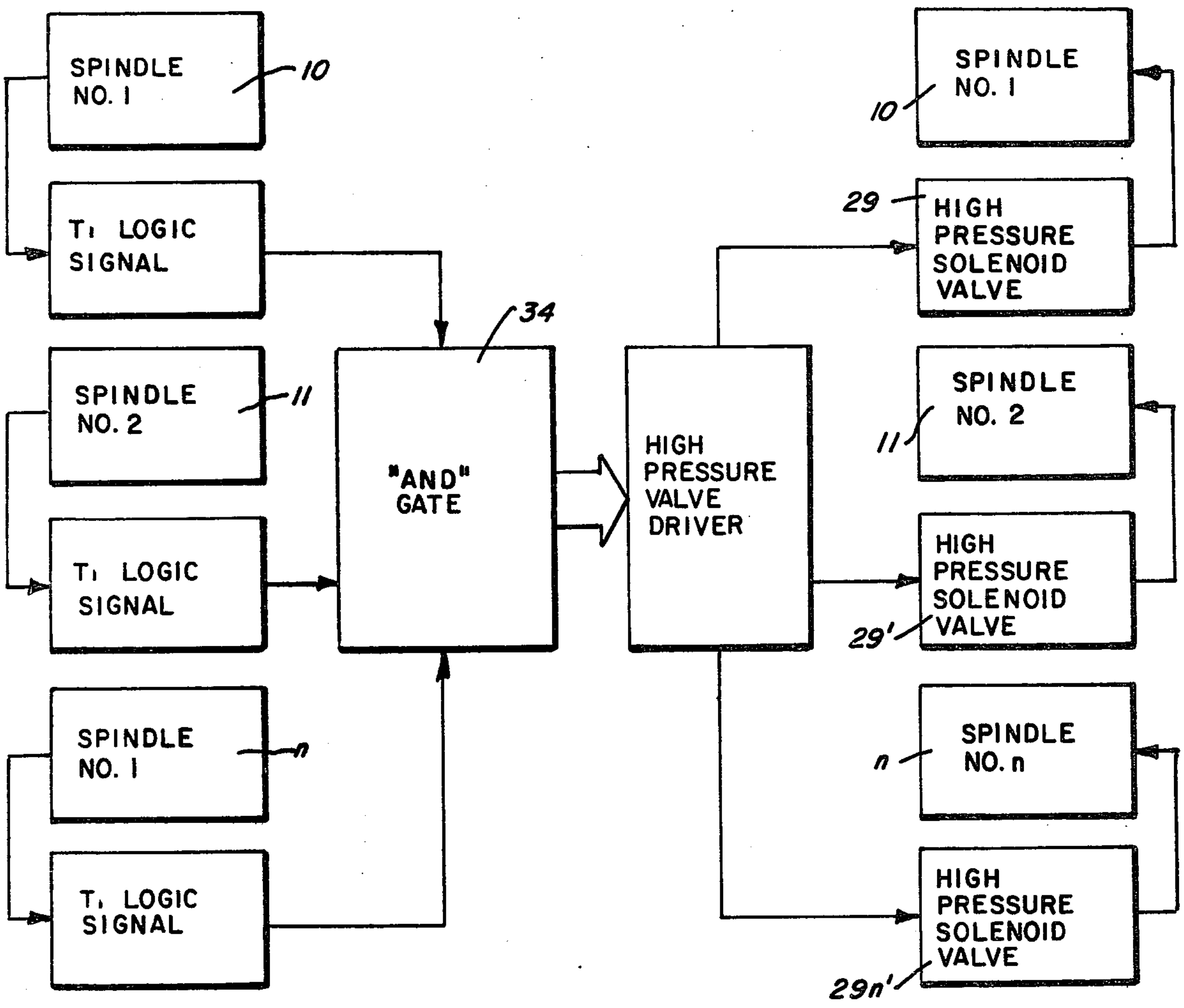
FIG. 3 is a block diagram illustrating the control of a plurality of torque-applying spindles requiring that each of a plurality of pairs of threaded members to be set by the apparatus be in a seated condition.

The control of the high pressure valves 29, etc. is illustrated in FIG. 3. Thus, the control 32 includes an AND gate 34 which may be connected in series with the solenoids of the respective air motor valves 27, etc., so as to cause concurrent operation of the air motor solenoids only when a proper logic signal is received from each of the spindles 10, 11, etc. More specifically, the logic signals delivered to AND gate 34 are produced only when the torque conditions of the respective spindles is indicative of a seated condition of the associated threaded members and thus, the AND gate 34 permits operation of the air motors under high pressure only when all of the pairs of threaded members are seated.

Figure 4:
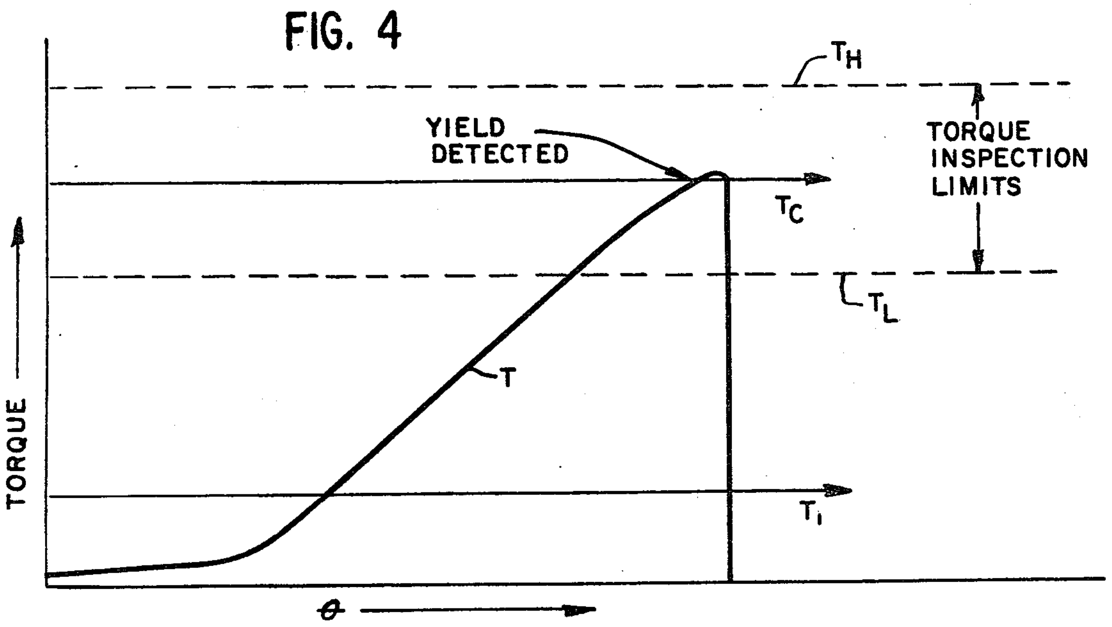
FIG. 4 is a graph of the torque-angle of rotation curve of an illustrative pair of threaded members.

As illustrated in FIG. 4, the logic signals delivered to AND gate 34 are delivered when the torque reaches a preselected low torque value, such as torque T1 indicative of the seated condition of the threaded members. As can be seen in FIG. 4, at this point in the applied torque-angle of rotation curve T, the torque is increasing at a constant rate relative to the angle of rotation increase. As further shown in FIG. 4, the torque increases at a constant rate during further tightening of the threaded members until the threaded members begin to yield as at the value Tc. At this point, the increase in the torque for an incremental increase in the angle of rotation begins to decrease and at the top of the curve T, the increase in torque approaches O foreffecting further rotation between the threaded members. The present invention provides means for causing discontinuation of further application of torque between the threaded members when a preselected yield condition is obtained. Thus, the seating of the threaded members is effected by a torque control and a setting of the threaded members is effected by a yield control.

Figure 6:
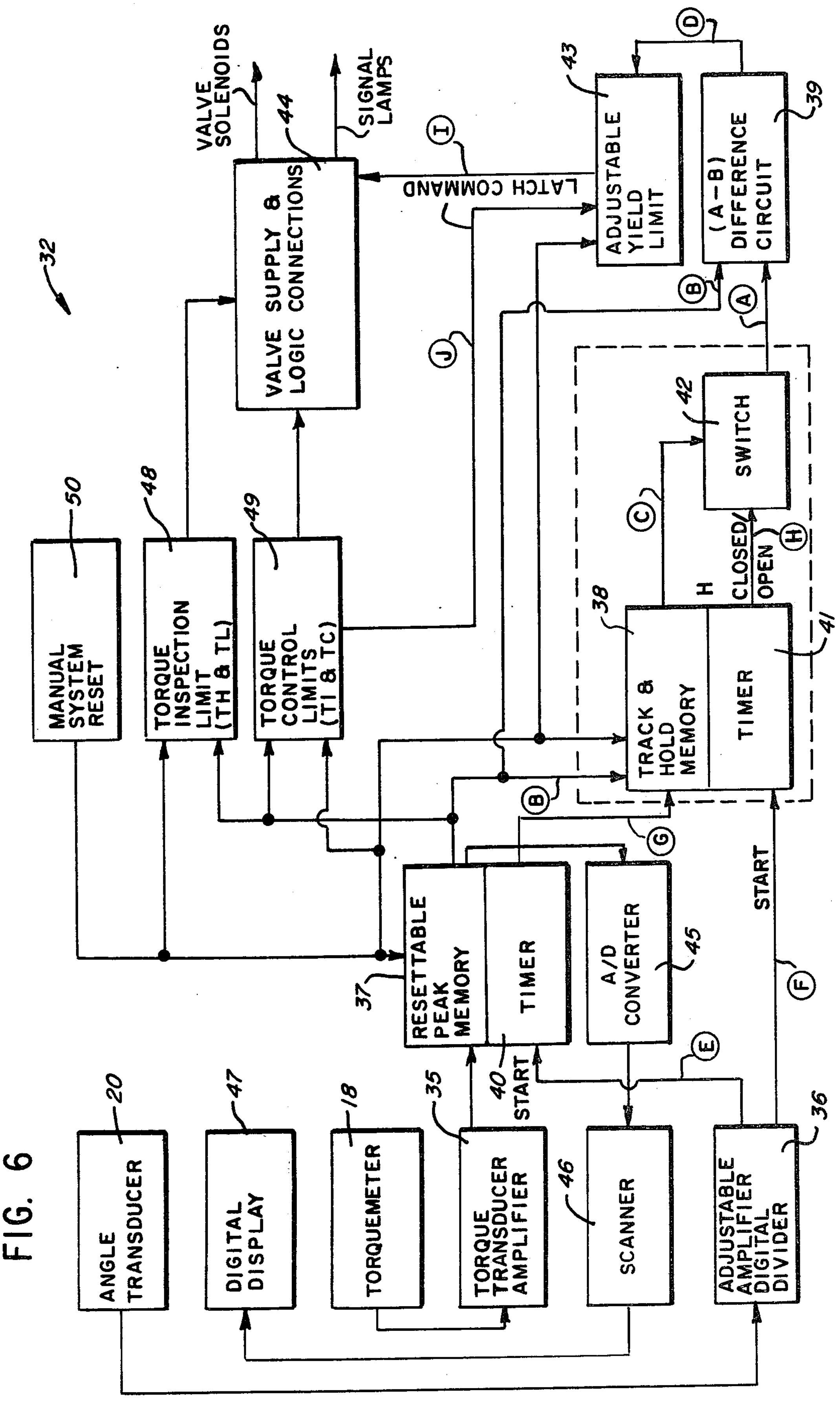
FIG. 6 is a block diagram illustrating the arrangement of the control.

Turning now more specifically to FIG. 6, control 32 includes an amplifier 35 for amplifying the signal from the torque sensor, such as torquemeter 18. As indicated above, the torquemeter may utilize a strain gauge sensor. Amplifier 35 may comprise a transducer amplifier for amplifying the signal provided by the strain gauge transducer. An excellent example of such a transducer amplifier is that identified as Model 6-201 marketed by the assignee hereof.

Angle sensor 20 comprises an angle transducer which is preferably of an incremental type. Such transducers are well known and may comprise either an optical or a magnetic sensor carried by the spindle 10 for detecting the rotation of the vanes 16a of the air motor, as discussed briefly above. The angle transducer 20 provides a series of pulses corresponding to a preselected angle of rotation. The signals from the transducer 20 may be provided to an adjustable amplifier and digital divider 36 so as to provide an amplified series of pulses corresponding to the angle of rotation between the threaded members 12 and 13.

As further shown in FIG. 6, the signal from the torque amplifier 35 is delivered to a resettable peak memory 37. The peak memory is preferably a unity gain amplifier storing the largest value of peak input signal until it is reset. The signal from the transducer amplifier 35 is an analog of the instantaneous torque being sensed by torquemeter 18. The peak memory stores the highest value of the torque signal provided from amplifier 35 and provides a signal corresponding to the peak value stored therein to a track-and-hold memory 38 and an analog difference circuit 39.

The amplifier and digital divider 36 may comprise a digital counter, such as that known as Model 6-260 marketed by the assignee hereof, which receives a variable frequency signal and produces a digital output corresponding to the input frequency. The peak memory 37 may comprise a track hold/peak module such as that identified as Model 6-749(A) marketed by the assignee hereof.

The analog difference circuit 39 may comprise a Model 6-752 analog processor marketed by the assignee hereof operable to provide a difference signal output.

The track and hold memory 38 may comprise a memory similar to memory 37 and, thus, illustratively comprising a track/hold/peak module such as that marketed under the catalog number 6-745(A) of the assignee hereof. As shown in FIG. 6, memory 37 may have associated therewith a first timer 40 and memory 38 may have associated therewith a second timer 41. The timers may comprise solid state timers of conventional construction providing selective time intervals as desired. The timers have a pair of complementary logic output signals which invert at start and revert back to the quiescent status a specified time after the start command. As shown in FIG. 6, the start command is obtained from the amplifier divider 36 for controlling each of the timers 40 and 41.

The output of timer 41 is fed to an electronic switch 42 which illustratively may comprise a conventional field effect transistor. The switch is arranged to be turned on and off by the pulse train delivered from timer 41 and controls the delivery of a signal C from the memory 38. The output of switch 42 comprises a signal A which is delivered to the analog difference circuit 39. The output of memory 37 comprises a signal B which is also delivered to the analog difference circuit 39. As indicated above, block 39 comprises an analog processor, and more specifically, is arranged to provide an output D representing the difference between the A and B signals.

Figure 5:
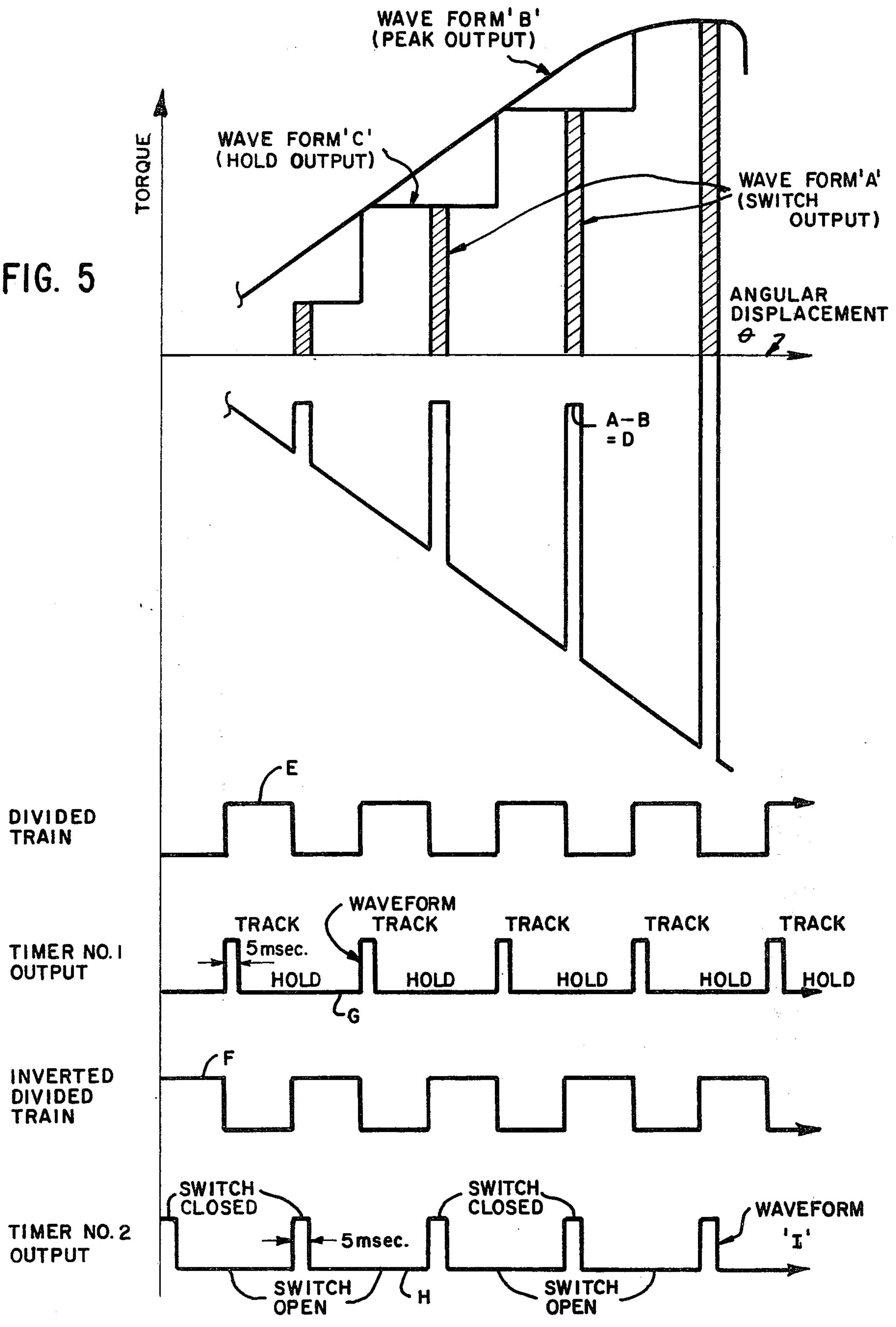
FIG. 5 is a graph illustrating a number of waveforms produced by the control.

As shown in FIG. 5, waveform B delivered from the peak memory generally corresponds to the upper portion of the waveform T of FIG. 4, and generally corresponds to the torque versus angular displacement curve for the given set of threaded members, such as members 12 and 13. The divided train signal from divider 36 comprises a waveform E, as illustrated in FIG. 5. A second divided train signal from divider 36, identified as waveform F, is illustrated in FIG. 5 as being inverted from the divided train waveform E. As shown in FIG. 6, waveform E comprises a signal delivered to timer 40 and waveform F comprises a signal delivered to timer 41. As shown in FIG. 5, the frequency of the signals E and F is identical. The frequency corresponds to the angular displacement sensed by the angle transducer 20, as discussed above.

The output of timer 40 comprises a track and hold command waveform G illustrated in FIG. 5. Thus, the pulse train E operates timer 40 to provide a short duration pulse train waveform G from the timer 40 to control the track and hold memory 38.

As further shown in FIG. 5, the output of timer 41 comprises a waveform H corresponding to the inverted divided train F but of short pulse duration. Illustratively, the pulses of waveforms G and H may comprise 5 millisecond pulses.

As further illustrated in FIGS. 5 and 6, waveform C, comprising the output of the track and hold memory 38, is caused to correspond to the signal from the peak memory 37 during the short pulse interval and is maintained at that sensed peak value by the memory 38 until the next pulsed sensing of the peak signal from memory 37 is provided as signal B to the memory 38. The resultant waveform C is a staircase waveform the period of which is equal to the period of the divided wave trains G and H as discussed above. The staircase waveform C is provided to the switch 42 as indicated above, which, as further indicated above, is turned on and off by the pulse train H delivered from timer 41 thereto. As shown in FIG. 5, pulse train H is offset in time from the pulse train G controlling the delivery of the peak signal B to the memory 38 and, thus, the output signal A of switch 42 comprises a series of pulses that are generated at a frequency corresponding to the divided train frequency and which have peak values corresponding to the peak values of the track and hold memory 38 defining the waveform C.

As further shown in FIG. 6, waveform B is delivered from the peak memory 37 to the analog difference circuit 39 for comparison with the analog waveform A delivered thereto from switch 42 with the output of the difference circuit 39 being a pulsed signal corresponding to the difference between waveforms A and B and identified as waveform D in FIG. 5.

The resultant waveform D, as shown in FIG. 5, corresponds inversely to the signal produced by the torque sensor 18 and, thus, its intermittent peak values remain constant at a small negative value during the time the torque-angle of displacement curve shown in FIG. 4 is rising at a constant value. However, when the curve T begins to change slope, as at the yield value Tc, the instantaneous peak algebraic difference between the waveforms A and B decreases, i.e. becomes less negative and approaches 0.

As shown in FIG. 6, the output waveform D is delivered to an adjustable yield limit 43, which may comprise a dual limit module, such as that identified as catalog No. 6-722 marketed by the assignee hereof. The limit module comprises an analog comparator which may be operated in the latching mode. Thus, when the comparator 43 senses a preselected decrease in the rate of torque increase for a given angular displacement, the comparator is operated to provide a shutoff signal I to the valve supply and logic connections 44 of the control. As further shown in FIG. 6, control 32 may include an analog digital converter 45 which may comprise any conventional converter, and illustratively may comprise a converter marketed by the assignee hereof under the catalog number 6-138. The input to converter 45 may comprise the output of memory 37 and the output of the converter 45 may be delivered to a scanner 46 which, in turn, delivers the signal to a digital display 47 of conventional construction. As desired, other of the signals generated in the control may be displayed by suitable delivery to the converter 45.

As further shown in FIG. 6, control 32 includes a torque inspection limit control 48 which may comprise a dual limit module, such as the module marketed under the catalog number 6-722 by the assignee hereof, for indicating whether the yield torque for a given pair of threaded members is below or above the torques $T_l$ and $T_h$, respectively, indicated in the graph of FIG. 4. Thus, the control 48 may provide a visual signal indicating whether the sensed yield torque for the given pair of threaded members is within, below, or above the torque inspection limits $T_l$ and $T_h$.

Control 32 further includes a torque control limit means which, again, may comprise a dual limit module, such as that marketed by the assignee hereof under the catalog number 6-722, for controlling the operation of the apparatus as a function of the measured torque. Thus, the control 49 receives the output signal from memory 37 so as to identify the seating torque $T_i$ and the desired maximum torque corresponding to the yield torque $T_c$ to provide a latch command signal J to the limit 43 for use in controlling the valve supply and logic connections 44 as a function of torque as discussed above.

Control 32 further includes a manual system reset 50 for resetting all of the elements of the control back to 0 for initiating a subsequent controlled threading operation.

Figure 7:
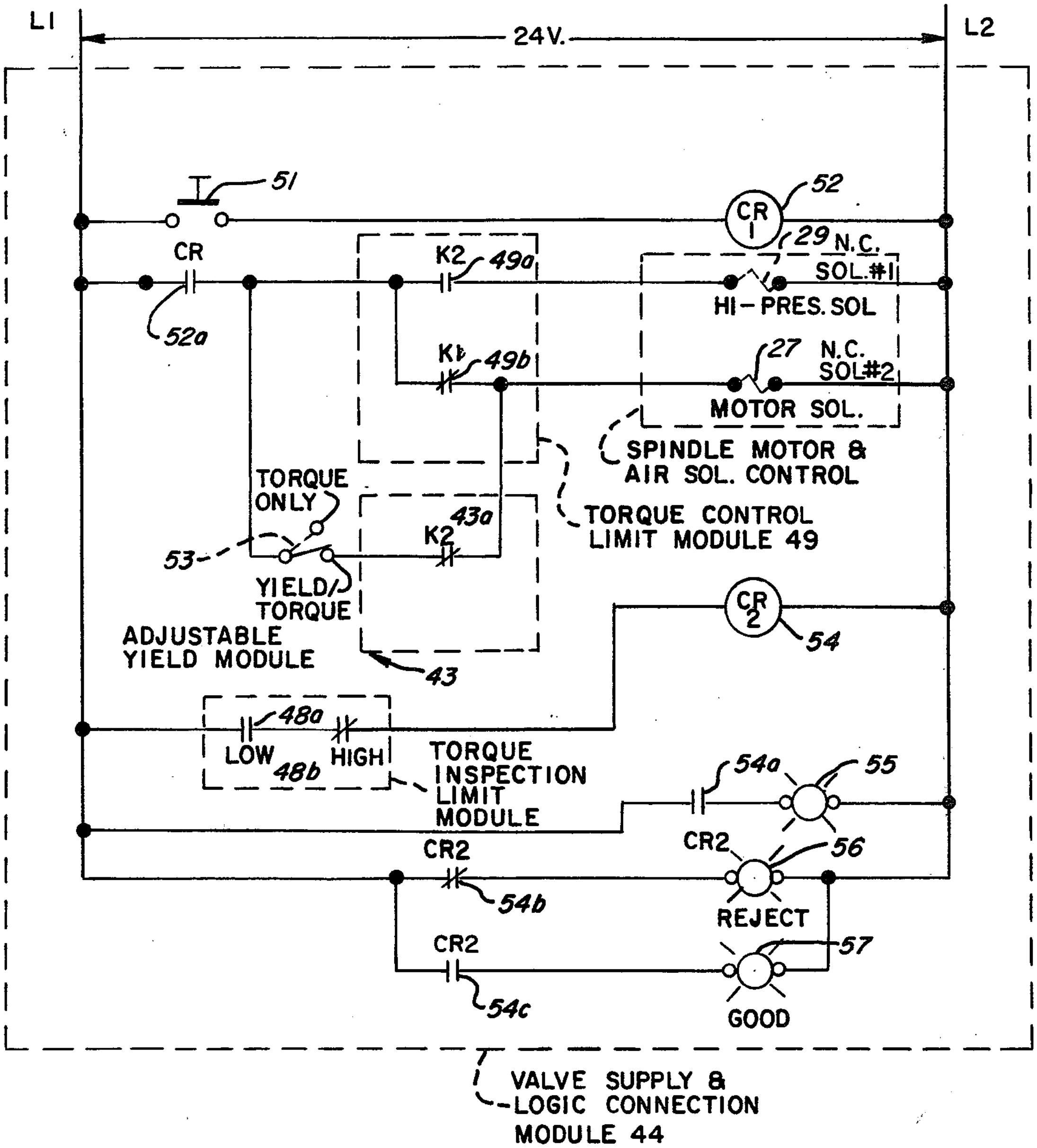
FIG. 7 is a schematic wiring diagram more specifically illustrating the control circuit for controlling the torque-applying means and indicating means.

Referring now to FIG. 7, the arrangement of the valve supply and logic connections 44 is illustrated in greater detail to include a customer start pushbutton 51.

Pushbutton switch 51 is connected in series with a control relay coil 52 between the power supply lines L1 and L2 so that when the pushbutton 51 is manually depressed, control relay coil 52 is energized. A normally open set of contacts 52*a* associated with the relay coil 52 is connected from power supply lead L1 through a normally open contact 49*a* of torque control limit 49 to the high pressure solenoid 29 which is connected to the other power supply lead L2. Contact 52*a* is further connected to a normally closed contact 49*b* of the torque control limit 49 which is connected in series with the air motor solenoid 27 which, in turn, is connected to the power supply lead L2.

In parallel with contact 49*b*, is a series connection of a selector switch 53 and a normally closed contact 43*a* of the yield limit 43. Selector switch 53 may be selectively arranged, as shown in full lines in FIG. 7, to arrange the control in the yield-torque mode and may be arranged in an open arrangement, as shown in dotted lines therein, to arrange the control to provide control of the threading operation as a function solely of the sensed torque being applied by the torque means between the threaded members.

A second control relay 54 is connected through a normally open contact 43*a* and a normally closed contact 48*b* of the torque inspection limit module 48. A first, normally open contact 54*a* associated with the control relay 54 is connected in series with an indicating light 55 between the power supply leads L1 and L2. A normally closed contact 54*b* associated with the coil 54 is connected in series with a reject light 56 across the power supply leads L1 and L2, and a third, normally open contact 54*c* associated with the coil 54 is connected in series with a good light 57 across the power supply leads L1 and L2.

Thus, in operation of the valve supply and logic connection module 44, the user may depress pushbutton 51 to energize relay coil 52, thereby closing contact 52*a* and energizing the motor solenoid 27 to initiate a threading operation under a low torque, high speed condition wherein only the low pressure branch of the feed circuit is connected to the air motor. When the torque control limit module 49 senses the torque reaching the value Tl shown in FIG. 4, contact 49*a* is closed thereby, so as to connect the high pressure solenoid 29 through closed contact 52*a* across the power supply leads L1 and L2 to energize the high pressure solenoid and effect a high pressure, low speed setting of the threaded members.

Assuming that the selector switch 53 is set in the yield-torque mode, the increase in torque is permitted until the contact 43*a* of the yield limit 43 opens, indicating that the preselected yield condition has occurred indicating the proper setting of the threaded members.

As the torque increases, the low contact 48*a* in series with relay coil 54 remains closed until the low limit Tl shown in FIG. 4 is reached, whereupon contact 48*a* closes to energize relay coil 54, inasmuch as contact 48*b* remains closed at this time. The closing of contact 54*a* in series with the indicator light 55 indicates the tensioning of the threaded members to within the desired torque limits set by the contacts 48*a* and 48*b*.

Energization of coil 54 further closes contact 54*c* to illuminate light 57 when the torque condition of the threaded members is at or above the lower limit $T_l$, as shown in FIG. 4. At this time, the reject light is extinguished as the contact 54*b* is now opened by the energization of coil 54. However, if the torque application continues until it passes the upper limit $T_h$, indicated in FIG. 4, contact 54*b* again closes so as to illuminate the reject light 56 and extinguish the good light 57.

When the selector switch 53 is set in the torque only mode, contact 43*a* does not control the operation of the motor solenoid, but rather, contact 49*b* effects the desired control so that the setting condition may be controlled solely by the sensed torque developed between the threaded members. Thus, switch 53 permits the selective use of the control as a yield control or a torque control as desired.

As will be obvious to those skilled in the art, the various components of the control 32 may be reset by suitably effecting a grounded condition thereof. Thus, the manual system reset 50 may effect such a reset. If desired, the control 44 may incorporate suitable electronic means for effecting an automatic reset upon completion of a threading operation.

The description of the control 32 has been set forth relative to its use with a single spindle. As discussed previously, the invention comprehends the use of the system with a multiple spindle apparatus, and in such use, the control 34 is utilized in combination with the control 44 and control 32, as will be obvious to those skilled in the art. Thus, the control may function in connection with the setting of a plurality of threaded member pairs so as to assure that each of the threaded member pairs is firstly seated before the yield-torque control setting operation is initiated. Where the yield-torque control is utilized, as discussed above, it is utilized in combination with an initial torque control seating operation so as to provide an improved accurate, efficient setting of one or more pairs of threaded members. The control of the present invention is extremely simple and economical of construction while yet providing the highly desirable features as discussed above.

The foregoing disclosure of specific embodiments is illustrative of the broad inventive concepts comprehended by the invention.

I claim:

1. In a torque-applying apparatus having torque means for forcibly threading a first threaded member sequentially into seated and then set tightened association with a second threaded member, a torque sensor for sensing the amount of torque being applied between said threaded members, and means for sensing a preselected angular amount of threaded rotation therebetween, an improved control for providing a preselected yielded tensioning of said first threaded member in the threaded association thereof with said second threaded member comprising:

torque determining means responsive to said torque sensor and angle sensing means for determining seriatim the incremental increase in torque provided by said torque means corresponding to a preselected incremental angle of rotation change, said torque determining means being arranged to determine said incremental increase subsequent to seating of the first threaded member relative to the second threaded member; and means for discontinuing application of torque between said threaded members by said torque means as an incident of a preselected decrease in the determined incremental torque increase sensed by said torque sensor indicating the set condition of said threaded members.

2. The torque-applying apparatus of claim 1 wherein said control includes a peak memory device for storing the highest previously sensed torque value for comparison with the next sensed torque value to determine said incremental torque increase.

3. The torque-applying apparatus of claim 1 wherein said control includes resettable peak memory device for storing the highest previously sensed torque value for comparison with the next sensed torque value to determine said incremental torque increase.

4. The torque-applying apparatus of claim 1 wherein said control includes an analog peak memory device for storing the analog of the highest previously sensed torque value for comparison with the next sensed torque value to determine said incremental torque increase.

5. The torque-applying apparatus of claim 1 wherein said torque means includes a rotor, means for coupling the rotor to the first threaded member, and means for retaining the second threaded member against rotative movement, and said means for sensing the angle of rotation between said threaded members comprises means for sensing the amount of rotation of said torque means rotor.

6. The torque-applying apparatus of claim 1 wherein said torque means includes a pneumatically operated motor having a rotor provided with rotatable vanes, means for coupling the rotor to the first threaded member, and means for retaining the second threaded member against rotative movement, and said means for sensing the angle of rotation between said threaded members comprises means for sensing the amount of rotation of said torque means rotor vanes.

7. The torque-applying apparatus of claim 1 further including means for firstly seating the first member relative to the second member by operation of the torque means at high speed and at low torque, and means for sensing the seated condition and initiating operation of said control to apply said preselected yielded tensioning by operation of the torque means at low speed and at increasing high torque.

8. The torque-applying apparatus of claim 1 further including means for sensing the threaded relationship of a second pair of first and second threaded members, means for firstly seating the first member relative to the second member of each of said pairs of threaded members by operation of the torque means at high speed and low torque, and means for sensing the seated condition and initiating operation of said control to apply said preselected yielded tensioning to each of said pairs of threaded members by operation of the torque means at low speed and at increasing high torque.

9. The torque-applying apparatus of claim 1 wherein said means for sensing the angle of rotation comprises adjustable means for providing a signal corresponding to any one of a number of different preselected angles of rotation.

10. The torque-applying apparatus of claim 1 wherein said control includes means for generating a voltage pulse corresponding to the ratio of the increments of applied torque to the preselected incremental angle of rotation, said means for discontinuing the application of torque effecting such discontinuation when said ratio decreases to a preselected value.

11. In a torque-applying apparatus having torque means for forcibly threading a first threaded member into tightened association with a second threaded member, a torque sensor for sensing the amount of torque being applied between said threaded members, and means for sensing a preselected angle therebetween, an improved control for providing a preselected yielded tensioning of said first threaded member in the threaded association thereof with said second threaded member comprising:

means responsive to said torque sensor and angle sensing means for determining seriatim the incremental increase in torque provided by said torque means corresponding to a preselected incremental angle of rotation change;

means for discontinuing application of torque between said threaded members by said torque means as an incident of a preselected decrease in the determined incremental torque increase sensed by said torque sensor; and means for preventing operation of means for discontinuing application of the torque until the sensed torque rises above a preselected threshold value.

12. The torque-applying apparatus of claim 1 wherein said control includes indicating means for indicating the sensed torque.

13. The torque-applying apparatus of claim 1 wherein said control includes a peak memory device for storing the highest previously sensed torque value for comparison with the next sensed torque value to determine said incremental torque increase, and indicating means for indicating the stored highest sensed torque value in the peak memory device.

14. The torque-applying apparatus of claim 1 wherein said control includes indicating means for indicating the last determined incremental torque increase.

15. The torque-applying apparatus of claim 1 further including means for first causing a preselected torque to be applied between said members subsequent to seating of said first member relative to said member, and upon said torque sensor sensing said preselected torque, potentiating the means for discontinuing application of torque to effect said discontinuation when said preselected decrease occurs.

16. The torque-applying apparatus of claim 1 further including means for first causing a preselected torque to be applied between said members, and upon said torque sensor sensing said preselected torque, potentiating the means for discontinuing application of torque to effect said discontinuation when said preselected decrease occurs.

17. In a torque-applying apparatus having torque means for forcibly threading a first threaded member into tightened association with a second threaded member, a torque sensor for sensing the amount of torque being applied between said threaded members, and means for sensing a preselected angular amount of threaded rotation therebetween, an improved control for providing a preselected yielded tensioning of said first threaded member in the threaded association thereof with said second threaded member comprising:

low torque means for causing threaded tightening of said first member relative to said second member by said torque means until said torque sensor senses a seated relationship of said first member to said second member;

high torque means for causing further threaded tightening of said first member relative to said second member until the applied torque sensor senses a preselected value of the applied torque; and means causing further threaded tightening of said first member relative to said second member by said torque means until the incremental amount of torque sensed by said torque sensor required to effect a preselected amount of relative threaded rotation between said members decreases to a preselected value indication of a yielded condition of the threaded members.

18. The torque-applying of claim 17 wherein said preselected value of torque is one whereat successive incremental increases in torque each corresponding to the preselected angle of rotation change are substantially constant.

19. The torque-applying apparatus of claim 17 further including additional threadedly associated first and second threaded members threaded together by said low and high torque means, and means for preventing operation of said high torque means until all of said first threaded members are in seated relationship to said second threaded members.

20. The torque-applying apparatus of claim 17 further including means for indicating the tension condition of the threaded members.

21. The torque-applying apparatus of claim 17 further including means for indicating the yielded condition of the threaded members.

22. The torque-applying apparatus of claim 17 further including means for selectively causing discontinuation of the threaded tightening operation when the torque sensed by said torque means reaches a preselected value.

23. The torque-applying apparatus of claim 17 wherein said torque sensor comprises a strain gauge torquemeter.

* * * * *